Aug. 3, 1943.  W. H. HUNT  2,325,680
FILLETING MACHINE
Filed Jan. 21, 1942   7 Sheets-Sheet 1

INVENTOR.
WILLIAM H. HUNT
BY
ATTORNEY.

Aug. 3, 1943.  W. H. HUNT  2,325,680
FILLETING MACHINE
Filed Jan. 21, 1942    7 Sheets-Sheet 7

INVENTOR.
WILLIAM H. HUNT
BY
ATTORNEY.

Patented Aug. 3, 1943

2,325,680

UNITED STATES PATENT OFFICE 2,325,680

FILLETING MACHINE

William H. Hunt, National City, Calif., assignor to The Atlantic Coast Fisheries Company, New York, N. Y., a corporation of Maine Application January 21, 1942, Serial No. 427,549

16 Claims. (Cl. 17—4)

This invention relates to a filleting machine. More particularly, it relates to an apparatus for feeding fish in proper position to a filleting machine.

An object of this machine is to provide a filleting machine in which the fish, including the tail feather and dorsal fin thereof, as it is fed to the filleting mechanism, is properly positioned and centered so that the filleting mechanism may function efficiently.

Another object of this invention is to provide a centering trough which, as the fish is fed therethrough, centers the fish so that the fish is presented to the filleting mechanism in proper position.

Another object of this invention is to provide a centering trough comprising a feed trough, a positioning trough and a tilting trough arranged in series and in alinement, whereby the fish as it is progressively fed therethrough will be properly and accurately centered and so presented to the filleting mechanism.

Other and additional objects will become apparent from the following description, appended claims, and accompanying drawings showing an illustrative embodiment of the invention and wherein:

Figures 2 and 2a constitute central longitudinal sections of the machine shown in Figures 1 and 1a;

Figure 3 is an enlarged top view of one of the fish-positioning mechanisms;

Figure 4 is a view of the under side (bottom) of the mechanism shown in Figure 3;

Figure 5 is a section taken on line 5—5 of Figure 2;

In filleting machines of the type and nature to which the instant invention relates, a decapitated fish is fed between a cutting mechanism, whereby two incisions are made in the back of the fish on opposite sides of the backbone and two incisions are made in the belly of the fish. The fish is then fed, preferably at great velocity, onto a pair of ribbing knives, each of which enters the respective incision in the back of the fish adjacent the backbone and cuts the fillet from the skeleton along the ribs.

The cutting mechanism for making the incisions in the dorsal side of the fish on opposite sides of the backbone usually consists of two closely spaced circular toothed knives, and the mechanism for making the incisions in the belly also consists of two rotating circular knives, preferably toothed.

For practical operation, it is necessary that a relatively large number of fish, such as from 60 to 100 fish, or indeed more, be filleted per minute. In addition, in order for such high speed operation to be efficient, the fish should be fed to the rotating knives in a properly centered condition so that the tail feather and dorsal fin of the fish are not presented to the path of travel of the rotating knives and the incisions are made in the desired places in the fish. The instant invention provides such a feeding and centering mechanism.

In accordance with the principles of the instant invention, there is provided a centering trough through which the decapitated fish, tail leading, is fed to the rotating knives. During the course of travel of the fish in the centering trough, the fish is centered and its position adjusted so that it will be fed to the rotating knives in a position whereby the incisions will be made as desired and the tail feather and dorsal fin will not be presented in the path of travel of the knives.

In general, the centering trough of the instant invention is composed of three component parts, i. e. a feed trough, a positioning trough and a tilting trough, arranged in series and in alinement so that the fish is progressively fed therethrough.

The fish is fed through the centering trough, tail leading, by means of pushers, carried on travelling endless chains engaging the end of the fish.

The decapitated fish is manually introduced into the feed trough with the tail leading, and the feed trough is made of such a shape and form as to substantially position the fish back downward and belly upward, even if the fish were not introduced in the trough in such a position.

The fish, as it is fed from the feed trough, passes to the positioning trough, where the fish is more accurately centered and positioned. The means for more accurately centering and positioning the fish comprises a plurality of mechanisms, each of which comprises a pair of fin guide plates so arranged as to provide a channel (fin guide) through which the tail feather and the dorsal fin pass. In addition, there are provided means which aid in guiding the tail feather and the dorsal fin into the fin guide. Still further, the positioning trough is provided with positioning guides which serve to position the fish vertically, back downward. Swivel guides are provided to maintain the fish in the adjusted vertical position.

From the positioning trough, the fish is fed into the tilting trough. The tilting trough is provided, generally, with means to retain the fish in position in which it is received thereby from the positioning trough. In addition, the tilting trough is also provided with means which comb and separate the components of the dorsal fin of the fish and guide the tail feather. The tilting trough is pivoted adjacent the positioning trough and is maintained in a slightly inclined upward position by the tension of a spring. At the forward end of the tilting trough, means are provided which are in close proximity to the rotating knives and preferably overlap the bottom rotating knives, together with means to further aid in the guiding of the fish to the rotating knives. The tilting trough is so constructed so as to feed the tail in a vertical plane between the rotating spaced knives. The fish is engaged by the knives and is propelled forwardly thereby. When the thicker portion of the body of the fish is engaged by the knives, the tilting trough will tilt so that the backbone and ribs are maintained at approximately the initial level and the knives will make the desired incisions. After the fish has left the tilting trough, the latter assumes its normal inclined upward position.

Figures 2, 3, 4, 5:
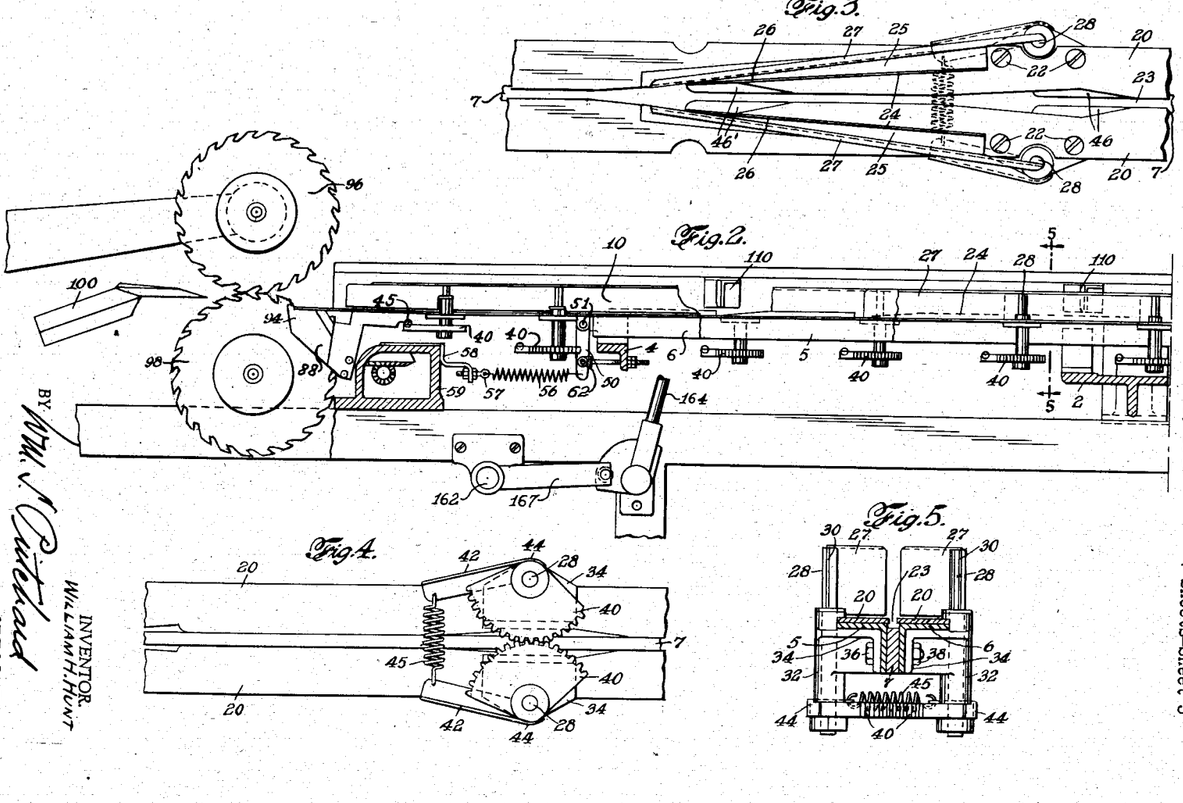
Figure 2A:
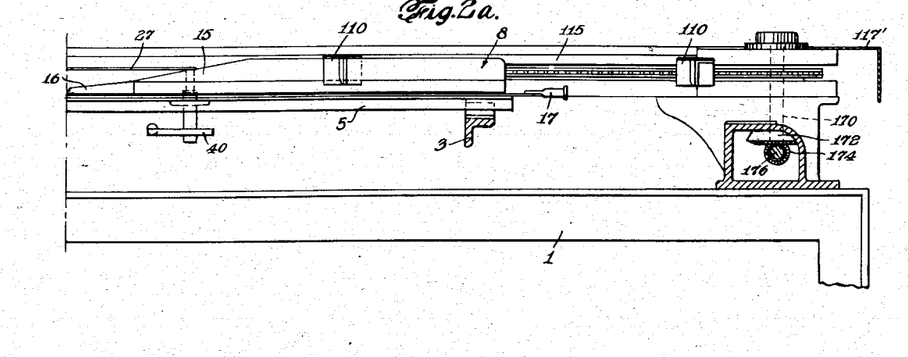

Referring now to the drawings wherein an embodiment of the instant invention is shown and wherein like reference numerals designate like parts, the reference numeral 1 designates a frame provided with a support 2 and supports 3 and 4, which carry angles 5 and 6 constituting supports. For reasons which will become apparent, the supports 5 and 6 are spaced apart by a spacer 7. As shown in Figures 2 and 2a, the supports 5 and 6 extend preferably longitudinally of the machine beneath the feed trough 8 and the positioning trough, which is generally designated by the reference numeral 10.

The feed trough is of such a design and construction that, if a fish is manually placed therein with the tail leading and the back downward or approximately horizontal, the fish will be positioned with the tail leading and the back of the fish engaging the bottom of the trough. The walls of the feed trough, generally designated by the reference numeral 11, are so designed and disposed with respect to the bottom of the feed trough that the fish, as it is fed through the trough, will be caused to retain or assume a more or less vertical position with its back downward and belly upward. In order to facilitate the introduction of the fish in the feed trough, the latter is preferably open at the top thereof.

Figure 12:
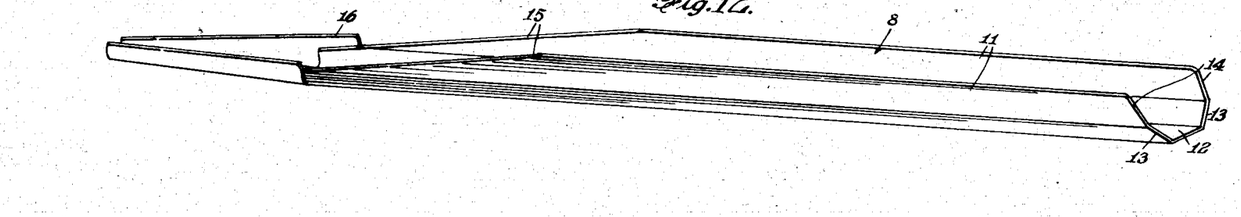
Figure 12 is a perspective of the feed trough.

Various specific constructions of the feed trough may be utilized. In the illustrative embodiment shown in Figure 12, the feed trough 8 is open at the top thereof and is provided with a substantially flat bottom 12. The side walls 11 of the trough 8 adjacent the feed-in end thereof flare upwardly, as shown by the reference numeral 13, from the bottom of the trough, and then extend in a substantially vertical direction, as shown by the reference numeral 14. The flared portions 13 of the side walls 11 extend throughout the length of the trough 8. For reasons which will become apparent, the portions 14 of the side walls do not extend throughout the length of the feed trough but terminate in an inclined portion 15.

In the form shown, the exit end of the trough 8 terminates adjacent to and preferably extends into and between a pair of forwardly converging members 16, which are designed to engage the fish preferably adjacent the backbone and aid in centering or positioning the fish (back downward). The members 16 may, if desired, be of the same construction as the positioning member 24, hereafter more fully described. The member 24, as shown in Figure 1a, is disposed intermediate a pair of swivel plates 27, also hereafter more fully described.

The converging members 16, in the form shown hereafter, are attached to and made integral with the trough 8. If desired, the converging members may be made separate from the trough 8, as, for example, by being made as a part of the positioning trough 10.

Figure 1:
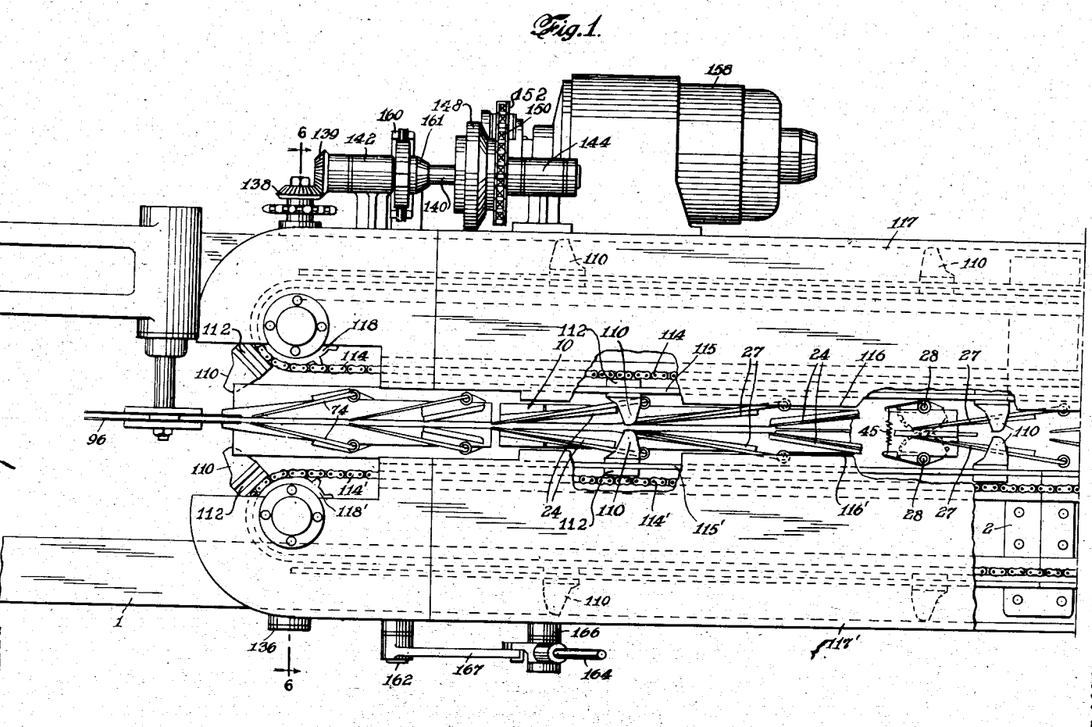
Figures 1 and 1a constitute a top plan view of a filleting machine embodying the principles of the instant invention, with certain parts thereof broken away.
Figure 1A:
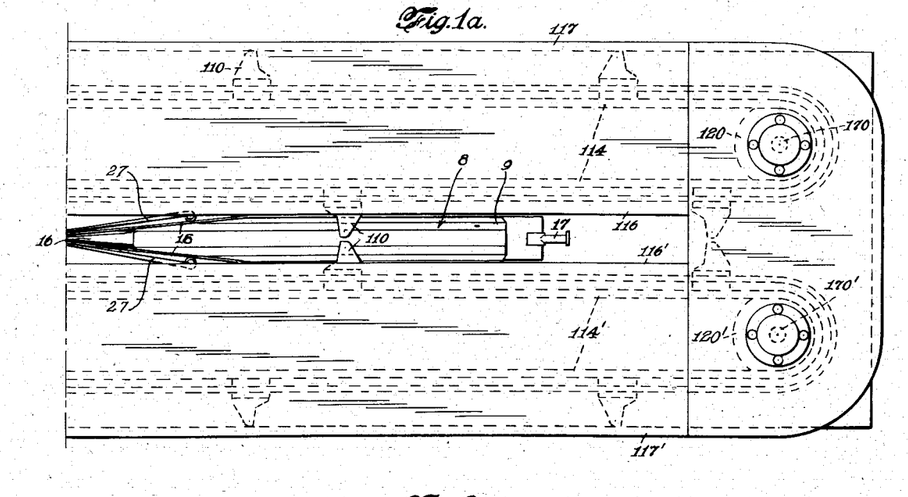

The feed trough 8 is appropriately positioned on the supports 5 and 6, as shown in Figures 1a and 2a. If desired, adjacent the feed-in end 9 of the feed trough 8, a water spray 17 may be provided so that the trough may be sprayed with water, whereby the coefficient of friction between the fish and trough is lessened.

The positioning trough 10, as previously explained, is constructed and provided with a plurality of mechanisms which will more accurately position and center the fish fed thereto from the feed trough 8. The bottom of the positioning trough 10 is composed of a pair of spaced fin guide plates 20, each of said fin guide plates being secured to the respective supports 5 and 6 in any suitable manner, as by means of screws 22. The space between the fin guide plates 20 is centrally disposed and communicates with the space between the supports 5 and 6 to constitute a channel 23 (see Figure 5) in and through which the tail feather and dorsal fin of the fish is fed and guided during the more accurate centering of the fish.

The positioning trough 10 is provided with a plurality of mechanisms which are designed to more accurately position and center the fish. Since these mechanisms are identical, only one of them need be described.

On each of the fin guide plates 20 there is provided a pair of positioning guides 24. As shown in Figure 3, each positioning guide is formed of an angle, the horizontal leg 25 being secured to the respective fin guide plate and the vertical legs being provided with an inwardly curved and downwardly extending flange 26. These positioning guides 24 converge in the direction of the feed of the fish and serve to engage the fish on the back adjacent the dorsal fin to prevent the fish from falling on its side and position it in a vertical position. Preferably, each of the positioning guides 24 also tapers in the forward direction. The positioning guides 24 are rigid, project upwardly for a relatively short distance, and may be termed "ribs."

To aid in positioning and maintaining the fish in a substantially vertical position, a pair of oppositely disposed swivel guides 27 are provided. As shown in Figure 3, the swivel guides 27 are adjacent to and exterior of the positioning guides 24 and also converge in the direction of the feed of the fish. Each of the swivel guides 27 is secured to a post 28 in any convenient manner. In the form shown, each post is provided with a slot 30, in which one end of the swivel guide 27 is inserted and secured. Each post 28 is rotatably mounted in a bearing 32, which is carried by a bracket 34 which is secured to the supports 5 and 6, as shown in Figure 5, by a bolt 36 and a nut 38.

Adjacent its lower end and beneath the fin guide plates 20, each post is provided with an equalizing gear segment 40. One end 44 of a lever 42 is attached to the post 28 adjacent the lower end thereof. The other end of the lever 42 is secured to a coil spring 45. It will thus become apparent that as a fish passes between and engages the swivel guides 27, and particularly as the fish approaches the exit end thereof, the swivel guides will expand and cause the posts to move the required amount on their axes. The tension of the spring 45 acting on the levers 42 tends to maintain the swivel guides in their normal position, which is as shown in Figure 3, and thus maintains the swivel guides in contact with the sides of the fish. When there is no fish between the swivel guides, the spring 45 causes the posts to assume their normal position, and hence the swivel guides assume their normal position. The normal position of the swivel guides 27 is controlled by the forward ends (in the direction of the feed) of the positioning guides 24.

To aid in the proper positioning of the tail feather and the dorsal fin in the channel 23, there are provided adjacent the channel 23 means which consist of a pair of downwardly extending beveled elements 46 appropriately secured to the respective fin guide plates 20, as by soldering. As will appear from Figure 3, the channel 23, adjacent the positions where the bevels 46 are provided, is wider than the remaining portion of the channel. Preferably, there is provided two sets of beveled elements 46 and 46' cooperating with each pair of positioning guides 24 and each pair of swivel guides 27. The distance between the respective pairs of beveled elements 46 and 46' is approximately such that, when the tail feather of a large size fish is engaged by the bevels 46, the dorsal fin will be engaged by the other pair of beveled elements 46'. In the case of small size fish, the tail feather will be engaged by the beveled elements 46', and the beveled element 46 will not at that time be in engagement with the said fish.

As will be seen from Figures 1 and 1a, there are provided five sets of the swivel guides, positioning guides, etc. It is, of course, to be understood that the invention is not restricted to this number but that any number thereof may be used. With whiting, it has, however, been found that five sets of these various elements are usually sufficient to properly position the fish.

The positioning trough, in the form shown, overlaps onto the exit end of the fed trough, and the fin guide plates 20 may extend even beneath the feed trough 8, as shown in Figure 2a. Normally, the positioning trough is so disposed with respect to the feed trough that the first positioning mechanism of the positioning trough is intermediate the inclined portion 18 of the feed trough 8, as shown in Figure 2a.

Figure 7:
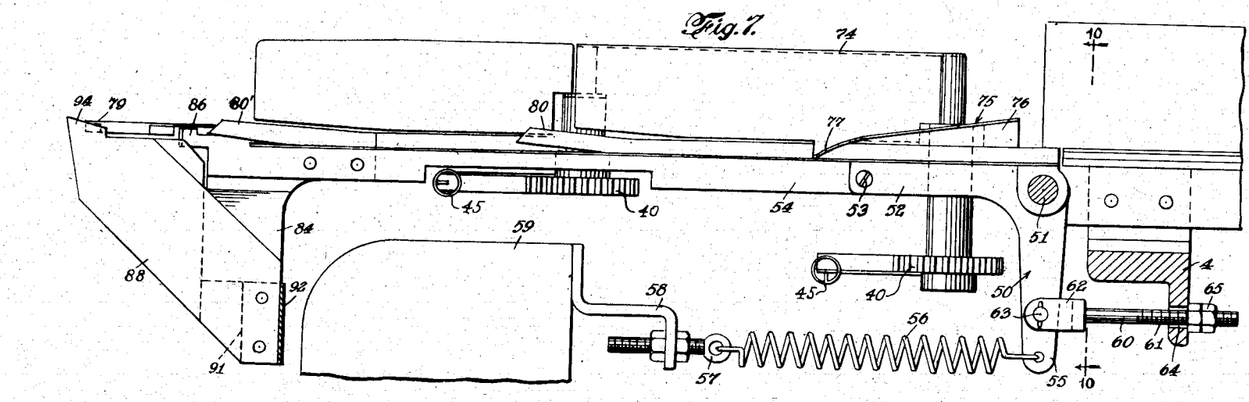
Figure 7 is a longitudinal section of the tilting trough.

Succeeding the positioning trough and in alinement therewith, there is provided the tilting trough. Referring now to Figures 2 and 7, there is provided a hinge 50 which is pivotally mounted on a stud 51 carried by the supports 5 and 6. The horizontal member 52 of the hinge 50 is secured by means of screws or rivets 53 to an angle support 54 which extends substantially throughout the length of the tilting trough. Adjacent its free end, the vertical member 55 of the hinge 50 is secured to one end of a spring 56, the other end of the spring being secured to an eye 57 adjustably carried in a bracket 58 which, in the form shown, is secured to a gear housing 59.

The tilting trough is maintained at a slightly inclined position, the inclination being upward from the hinge in the direction of the feed. The degree or angle of inclination of the tilting trough is adjustable, and means are provided to maintain the tilting trough at the desired adjusted normal position. This means, as shown in Figures 2 and 7, comprises a shank 60 having a threaded portion 61 adjacent one end thereof and provided with a bifurcated fork 62 on the opposite ends. The fork 62 is secured to the vertical member 55 by a cotter pin 63 passing through aligned holes provided in the fork 62 and the vertical member 55. The threaded portion 61 of the shank 60 passes through a hole 64 in the support 4, and nuts 65 are screwed on the end of the shank projecting beyond the support 4. It is to be noted that the hole 64 is of a greater diameter than the shank 60, and particularly the threaded portion 61 thereof which passes through said hole. As a result of this construction, when the tilting trough is depressed, the shank 60 will freely slide (to the right in Figure 7) in the hole 64. The nuts 65 cooperating with the support 4 limit the movement of the vertical member 55 of the hinge 50 (to the left in Figure 7). By adjustment of the nuts 65, the degree of inclination of the trough may be adjusted, and such adjustment will not in any way interfere with the depression or tilting of the trough during its normal operation, as will hereafter be described.

The bottom of the tilting trough is also composed of spaced fin guide plates 72 which porvide a channel 73 through which the tail feather and the dorsal fin pass. The channel 73 is in alinement with the channel 23 of the positioning trough.

Figure 8:
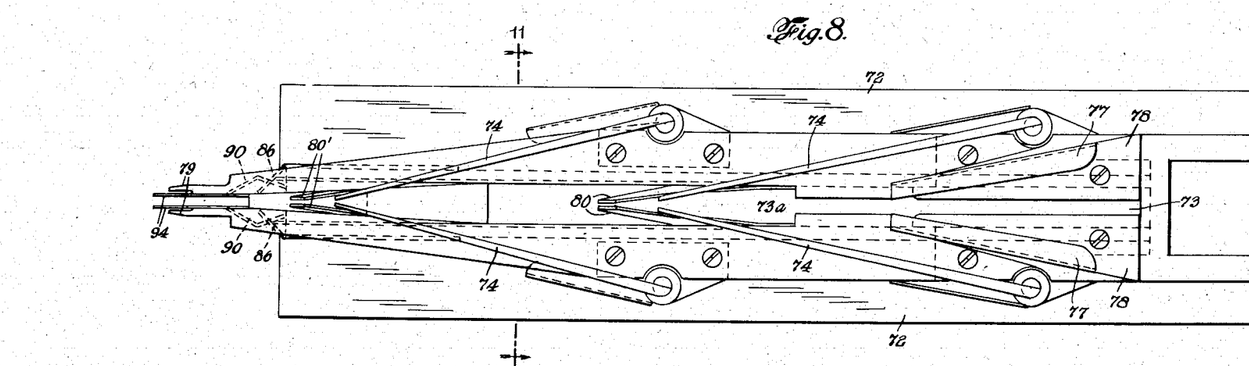
Figure 8 is a top plan view of the tilting trough.
Figure 9:
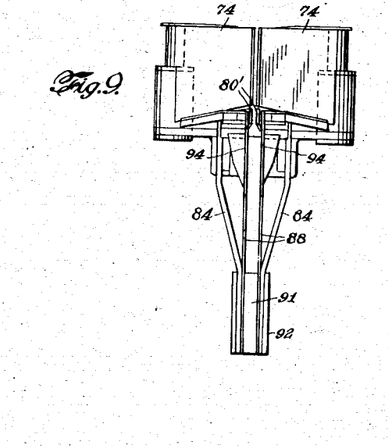
Figure 9 is an end view looking to the right of of Figure 7.
Figure 10:
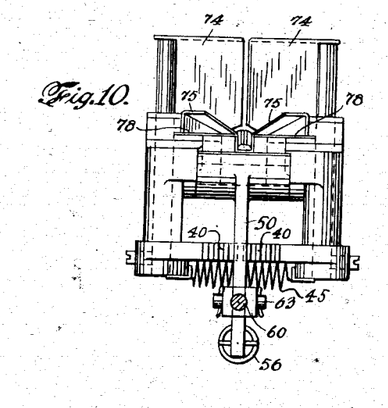
Figure 10 is a section on line 10—10 of Figure 7.
Figure 11:
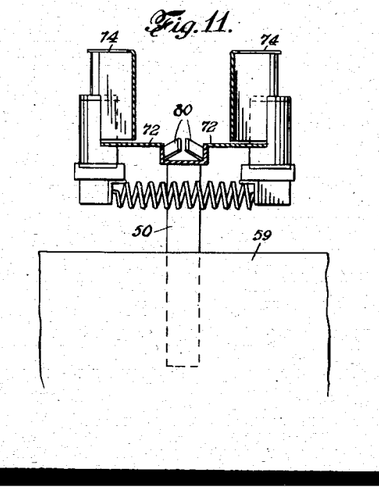
Figure 11 is a section taken on line 11—11 of Figure 8.
Figure 13:
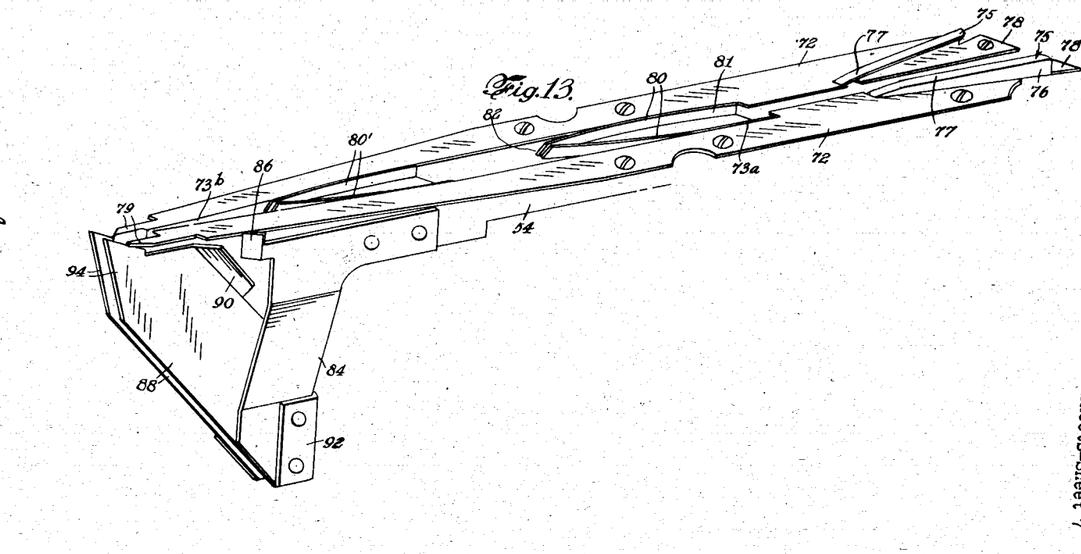
Figure 13 is a perspective of the tilting trough, with parts thereof omitted for purposes of convenience and clarity.

In the form shown (see Figures 7 and 8), the tilting trough is provided with two pairs of swivel guides 74 which are of the same construction and function in the same manner as the swivel guides 27 of the positioning trough, and hence need not be more fully described here. Cooperating with the first pair of swivel guides 74 and intermediate thereof are a pair of oppositely disposed positioning members 75. As shown in Figures 8, 10 and 13, each of the positioning members 75 consists of a vertical member 76, the bottom of which is secured in any appropriate manner to the respective fin guide plates 72. At the top, each vertical member 76 is provided with an inwardly extending curved member 77. As shown in Figures 10 and 13, the curved members 77 are inclined downwardly and are positioned so as to converge in the direction of the feed. Additionally, each of the members 77 is so curved as to engage the fish at the sides adjacent the bottom thereof in a manner so as to more accurately center or retain the fish in the vertical position in which it was delivered from the positioning trough and, at the same time, assure that the tail feather and the dorsal fin of the fish enter into and travel through the channel 73. The curvature of the member 77 is greatest adjacent the feed-in end thereof and gradually flattens out until it is relatively flat at the exit end thereof. If desired, the vertical member 76 may be secured to a flat plate 78 which is in turn secured to the fin guide plates. The positioning members 75 are substantially identical in construction with the positioning guides 24.

In order to guide the tail feather and the dorsal fin, the tilting trough is provided with a pair of dorsal fin guides 80 in advance of the forward end of each pair of swivel guides 74 in the direction of the feed. As shown in Figures 8 and 13, each dorsal fin guide 80 is formed of a pair of oppositely disposed spring members secured in any suitable manner to the fin guide plate so as to receive and thereafter comb the tail feather and dorsal fin of the fish.

In the form shown (see Figure 8), the channel 73 at a position in advance of the forward end of the first pair of swivel plates 74 is appreciably widened, the widened channel being designated by the reference numeral 73a. In this embodiment, each spring member of the dorsal fin guide 80 is secured adjacent the rear end thereof to a fin guide plate 72 in the channel 73a. As a consequence, the width of the feed-in end 81 of the dorsal fin guide is approximately the same as the width of the channel 73a. Each member of the dorsal fin guide is curved inwardly from the feed-in end thereof so that they are in close proximity at their free ends 82. In addition, each member of the dorsal fin guide is positioned so that it gradually inclines or tapers upwardly, with the result that the free ends 82 thereof are disposed in a horizontal plane above that of the guide plates.

The channel 73a extends forwardly in the tilting trough to beyond the second pair of dorsal fin guides 80'. Thereafter it becomes narrower, as designated by the reference numeral 73b, and enlarges at the end of the trough (see Figure 13). It is further to be noted that the fin guide plates 72 terminate in spaced projections or terminals 79.

Adjacent the forward end of the tilting trough, there is provided a pair of guide supports 84, each of which is secured to the supporting angle 54. Each guide support 84 is bent into the shape shown in Figure 13 and is provided at the top thereof with a guide 86. A pair of closely spaced guide plates 88, of the form and shape shown in Figure 13, and each having a guide 90, is also provided. At the lower ends thereof, the guide supports 84 are disposed on the guide plates 88 and a block 91 is positioned intermediate the guide plates 88. These elements are secured together in any convenient manner, as by a U-shaped element 92.

The upper portions 94 of the guide plates 88 extend intermediate the lower pair of knives 98 and the terminals 79 of the fin guide plates extend outside of said pair of rotating knives 98.

The tilting trough is so constructed and the spring 56 so balanced that when, after the tail feather has been introduced in the space (in the vertical plane) between the knives 96 and 98 and the thicker portion of the body of the fish is engaged by the knives, the tilting trough will tilt so that the backbone and ribs are maintained at approximately the initial level and the knives make the desired incision. The cutting knives 98 are serrated and each will make an incision in the back of the fish adjacent the backbone. The upper rotating knives 96 are movably mounted so that they may move in a vertical direction, and each of said knives makes an incision in the belly. Thereafter, the fish is propelled on to the ribbing knives 100, which cut the fillets from the skeleton. The rotating knives 96 and 98 and the ribbing knives 100 are of the type usually employed in filleting machines and, therefore, require no further explanation thereof.

The fish are pushed through the centering trough by means of appropriately spaced pushers 110, each of which is mounted on an H-shaped block 112 secured to a continuous chain 114 travelling in horizontal planes. As shown in Figures 1 and 1a, there are two continuous chains 114 and 114', one on each side of the trough. The pushers 110 are so disposed on the chains that a pair of them will push a fish through the machine. The pushers 110 on each chain are spaced apart sufficiently so that the distance therebetween is somewhat greater than the length of the decapitated fish to be filleted.

The blocks 112 on the chains 114 and 114' are guided by and travel between rails 115 and 115' extending throughout the apparatus. Guards 117 and 117', having beveled edges 116 and 116' respectively, are provided to protect the respective chains.

Figure 6:
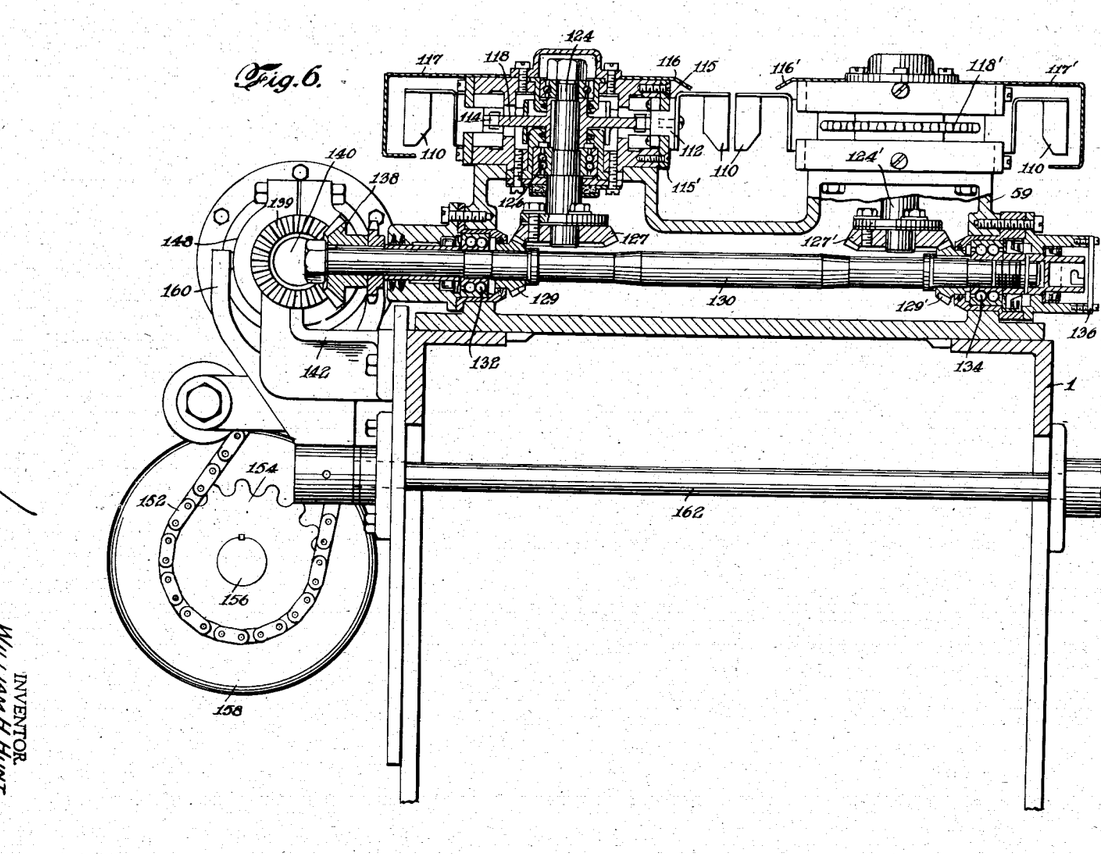
Figure 6 is an enlarged section taken on line 6—6 of Figure 1.

The driving mechanism for the chains will now be described. The gear casing 59 is supported on the frame 1, as shown in Figure 6. The chain 114 cooperates with sprocket wheels 118 and 120 and the chain 114' cooperates with sprocket wheels 118' and 120'.

The sprocket wheels 118 and 118' are secured to vertical shafts 124 and 124' which are appropriately mounted, in the gear casing, in ball-bearings 126. At the lower ends, the shafts 124 and 124' are provided with gears 127 and 127' which mesh with gears 129 and 129' on the horizontal shaft 130, which is suitably journaled in ball-bearings 132 and 134. A cap 136 covers one end of the shaft 130. The other end of the shaft 130 is provided with a gear 138 meshing with a gear 139, which is carried on a shaft 140, carried in bearings 142 and 144 secured to the frame of the machine. A disc clutch, generally designated by the reference numeral 148, is provided. The clutch 148 includes a sprocket 150 which is driven by a chain 152 from a sprocket 154, carried by a shaft 156 of a motor 158. A yoke shifter 160 is secured to the slidable cone 161 of the clutch. The shifter 160 is carried by the shaft 162 which is operated by a hand lever 164, appropriately mounted on the frame at 166, through a lever 167. As shown in Figure 1, the clutch is out of engagement and the conveyor chains will not be moved.

The sprocket wheels 120 and 120' (Figures 1a and 2a) are idle and are mounted on vertical shafts 170 and 170', respectively. In the form shown, each vertical shaft 170 and 170', at the lower end thereof, is provided with a gear 172 which meshes with a gear 174, carried on a horizontal shaft 176.

The size and arrangement of the various elements and details of construction, of course, will vary with the size of the fish to be filleted. Generally, however, the positioning and centering mechanism on the positioning trough are so disposed that the exit end of a pair of swivel guides will be in close proximity to the entrance end of the next succeeding pair of swivel guides. The swivel guides on the tilting trough will be similarly disposed and, in addition, the exit end of the last pair of swivel guides on the positioning trough will be in close proximity to the entrance end of the swivel guides on the tilting trough. As has been previously mentioned, the first pair of swivel guides on the tilting trough overlaps the feed trough 8.

The positioning guides 24 on the positioning trough are rigid and serve to position the fish in a vertical direction. In addition, the guides 24 engage the fish at the back adjacent the dorsal fin and tend to properly position the fish when the latter tilts. The beveled plates 46 and 46' serve to direct the tail feather and the dorsal fin into the channel 23. The positioning guides 24 on the positioning trough are disposed intermediate the swivel guides 27 and are of somewhat shorter length.

As shown in Figure 8, the positioning guides 75 of the tilting trough are also disposed intermediate the swivel guides 74. However, the lead-in end of the positioning guides 75 extend somewhat in advance of the swivel guides 74. The purpose of this is to assure the reception of the fish from the positioning trough in proper position.

In operation, the motor is started and, upon proper manipulation of the handle 164, the disc 161 of the clutch is brought into clutching relationship with the clutch hub 163, whereby each of the chains 114 and 114' is driven by the mechanisms previously described to travel in a horizontal plane. A decapitated fish, with tail leading and back downward, is manually introduced into the feed trough 8. As the chains 114 and 114' travel, a pair of pushers 110 will engage the rear end of the fish and push it through the centering trough, from whence it is propelled to the rotating knives and ribbing knives. As the fish is pushed through the feed trough 8, it is in or made to assume a more or less vertical position due to the construction and particularly the cross-section of the trough 8, and the ribs 16. After passing through the feed trough, the fish is pushed by the pushers 110 onto the fin guide plates 20 of the positioning trough 10, wherein the fish is more accurately centered and positioned. The tail of the fish, upon passing to the positioning trough, enters the channel 23 or, if it does not enter such channel, the pair of beveled elements 46 of the first positioning mechanism tends to introduce the tail feather into the channel 23 and then tends to introduce the dorsal fin in said channel. As the fish continues its passage through the first positioning mechanism, the back thereof, and particularly the portions adjacent the dorsal fin, engage the pair of positioning guides 24, which tend to (tilt if necessary) position the fish in a vertical direction. The swivel guides 27 of the first positioning mechanism engage the fish at the opposite sides thereof and tend to maintain the fish in the vertical direction. As the sides of the fish engage the swivel guides 27, the latter expand sufficiently to permit the fish to pass therebetween. When the swivel guides 27 are expanded to accommodate the fish, the posts 28 carrying said guides will be rotated. Due to the equalizing gear segments 40 and the spring 45, the swivel guides 27 will be urged to assume their normal position thereby engaging the fish and holding it in a substantially vertical position (back downward). This procedure as to the centering of the fish is effected in each one of the plurality of positioning mechanisms on the positioning trough, and thereby an accurate centering of the fish is obtained.

From the positioning trough, the fish is pushed onto the tilting trough. Since the fish has been accurately centered in the positioning trough, the tail feather of the fish enters the channel 73 of the tilting trough, which is in alinement with the channel 23 of the positioning trough. The fish also engages the positioning guides 75, whereby the fish is maintained accurately centered, and the swivel guides 74 serves to maintain the fish in the position which it has been made to assume. As the tail of the fish leaves the first pair of swivel guides 74 on the tilting trough, it passes between the pair of dorsal fin guides 80, where the tail is guided. Continued movement of the fish causes the dorsal fin to pass through the enlarged portion 73a of the channel 73 and then, as it leaves the swivel guides 74, to be engaged by the dorsal fin guides 80, which also guide the dorsal fin. The fish, in its continued progress, then is fed between the second pair of swivel guides on the tilting trough and through the dorsal fin guides in advance thereof. Continued movement of the fish causes the tail feather to pass into the vertical space between the knives. The dorsal fin is likewise directed between the rotating knives and out of the path of travel thereof. When the knives engage the thicker portion of the body of the fish, the trough tilts whereby the backbone and ribs are maintained at approximately the initial level and the knives make the desired incision. The tilting of the trough is momentary and, as soon as the thicker portion of the fish has passed between the knives, the spring 56 brings the tilting trough back into normal position. The fish is pushed by the pushers on chains at a relatively high speed, with the result that, when a fish is projected between the knives 96 and 98, the force of the projection, in addition to the force imparted by the rotating knives, feeds the fish at a high velocity onto the ribbing knives 100, where the filleting is completed.

Since it is obvious that various changes and modifications may be made in the above description without departing from the nature or spirit thereof, this invention is not to be restricted thereto except as set forth in the appended claims.

I claim:

1. In a fish filleting machine having means to form an incision in the back of the fish on each side of and adjacent the backbone thereof, means to push a fish, tail leading and back downward, to said incision-making means, and a centering trough through which the fish is pushed and wherein the fish is centered so that it is fed to the incision-making means in proper position, said centering trough having a channel to guide the tail feather of the fish, means to position the fish in a vertical direction, means to engage the fish on opposite sides thereof to maintain the fish substantially vertically, and means to guide the tail feather and dorsal fin thereof.

2. In a fish filleting machine having means to form an incision in the back of the fish on each side of and adjacent the backbone thereof, means to push a fish, tail leading and back downward, to said incision-making means, and a centering trough through which the fish is pushed and wherein the fish is centered so that it is fed to the incision-making means in proper position, said centering trough having a channel to guide the tail feather of the fish, means adjacent said channel to aid in introducing the tail feather in said channel, means to position the fish in a vertical direction, means to engage the fish on opposite sides thereof to maintain the fish substantially vertically, and means to guide the tail feather and dorsal fin thereof.

3. In a fish filleting machine having means to form an incision in the back of the fish on each side of and adjacent the backbone thereof, means to push a fish, tail leading and back downward, to said incision-making means, and a positioning trough through which the fish is pushed, said positioning trough having a channel extending throughout the length thereof to guide the tail feather and a plurality of devices arranged in series to position the fish, each of said devices comprising means to position the fish in a substantially vertical direction, and means to engage the fish on opposite sides thereof to maintain the fish substantially vertically.

4. In a fish filleting machine having means to form an incision in the back of the fish on each side of and adjacent the backbone thereof, means to push a fish, tail leading and back downward, to said incision-making means, and a positioning trough through which the fish is pushed and whereby the fish is positioned, said positioning trough having a channel extending throughout the length thereof to guide the tail feather and a plurality of devices arranged in series to position the fish, each of said devices comprising means to aid in introducing the tail feather in said channel, means to position the fish in a substantially vertical direction, and means to engage the fish on opposite sides thereof to maintain the fish substantially vertically.

5. In a fish filleting machine having means to form an incision in the back of the fish on each side of and adjacent the backbone thereof, means to push a fish, tail leading and back downward, to said incision-making means, and a positioning trough through which the fish is pushed and whereby the fish is positioned, said positioning trough having a channel extending throughout the length thereof to guide the tail feather and a plurality of devices arranged in series to position the fish, each of said devices comprising a pair of oppositely disposed beveled elements to aid in introducing the tail feather in said channel, means to position the fish in a substantially vertical direction, and means to engage the fish on opposite sides thereof to maintain the fish substantially vertically.

6. In a fish filleting machine having means to form an incision in the back of the fish on each side of and adjacent the backbone thereof, means to push a fish, tail leading and back downward, to said incision-making means, and a positioning trough through which the fish is pushed and whereby the fish is positioned, said positioning trough having a channel extending throughout the length thereof to guide the tail feather and a plurality of devices arranged in series to position the fish, each of said devices comprising a pair of oppositely disposed ribs extending longitudinally of and converging in the direction of the feed to engage the fish and position it in a substantially vertical direction, said channel passing between said ribs, and means to engage the fish on opposite sides thereof to maintain the fish substantially vertically.

7. In a fish filleting machine having means to form an incision in the back of the fish on each side of and adjacent the backbone thereof, means to push a fish, tail leading and back downward, to said incision-making means, and a positioning trough through which the fish is pushed and whereby the fish is positioned, said positioning trough having a channel extending throughout the length thereof to guide the tail feather and a plurality of devices arranged in series to position the fish, each of said devices comprising a pair of oppositely disposed upstanding ribs extending longitudinally of and converging in the direction of the feed and provided with curved surfaces to engage the fish and position it in a substantially vertical direction, said channel passing between said ribs, and means to engage the fish on opposite sides thereof to maintain the fish substantially vertically.

8. In a fish filleting machine having means to form an incision in the back of the fish on each side of and adjacent the backbone thereof, means to push a fish, tail leading and back downward, to said incision-making means, and a positioning trough through which the fish is pushed and whereby the fish is positioned, said positioning trough having a channel extending throughout the length thereof to guide the tail feather and a plurality of devices arranged in series to position the fish, each of said devices comprising means on opposite sides of said channel to position the fish in a substantially vertical direction, and a pair of spring-controlled swivel guides to engage the fish on opposite sides thereof to maintain the fish substantially vertically.

9. In a fish filleting machine having means to form an incision in the back of the fish on each side of and adjacent the backbone thereof, means to push a fish, tail leading and back downward, to said incision-making means, and a positioning trough through which the fish is pushed and whereby the fish is positioned, said positioning trough having a channel extending throughout the length thereof to guide the tail feather and a plurality of devices arranged in series to position the fish, each of said devices comprising means on opposite sides of said channel to position the fish in a substantially vertical direction, a pair of plates disposed exteriorly of the means to position the fish and normally converging in the direction of the feed to engage the fish at opposite sides thereof, means to pivotally mount each of said plates at the rear end thereof, and spring-controlled means to continuously urge the plates into the normal converging position.

10. In a fish filleting machine having means to form an incision in the back of the fish on each side of and adjacent the backbone thereof, means to push a fish, tail leading and back downward, to said incision-making means, and a positioning trough through which the fish is pushed and whereby the fish is positioned, said positioning trough having a channel extending throughout the length thereof to guide the tail feather and a plurality of devices arranged in series to position the fish, each of said devices comprising means on opposite sides of said channel to position the fish in a substantially vertical direction, a pair of plates disposed exteriorly of the means to position the fish and normally converging in the direction of the feed to engage the fish at opposite sides thereof, a pair of spaced rotatably mounted posts, each post being secured to the rear end of one of said plates, each post having secured thereto beneath the trough an equalizing gear which is disposed in cooperative relationship, and each post having secured thereto a lever and a spring connecting said levers.

11. In a fish filleting machine having means to form an incision in the back of the fish on each side of and adjacent the backbone thereof, means to push a fish, tail leading and back downward, to said incision-making means, and a centering trough through which the fish is pushed and wherein the fish is centered so that it is fed to the incision-making means in proper position, said centering trough comprising a positioning trough having a channel extending throughout the length thereof to guide the tail feather and a plurality of devices arranged in series to position and substantially maintain the fish in a substantially vertical direction, a tilting trough arranged in alinement and in close proximity to said positioning trough whereby a fish pushed from said positioning trough will pass to said tilting trough, means to tiltably mount said tilting trough adjacent the rear end thereof, said tilting trough having a channel extending throughout its length and disposed in alinement with the channel of said positioning trough, means to receive and maintain the fish in substantially the position as received from the positioning trough, and means to guide the tail feather and dorsal fin as the fish is pushed across the tilting trough.

12. In a fish filleting machine having means to form an incision in the back of the fish on each side of and adjacent the backbone thereof, means to push a fish, tail leading and back downward, to said incision-making means, and a centering trough through which the fish is pushed and wherein the fish is centered so that it is fed to the incision-making means in proper position, said centering trough comprising a positioning trough having a channel extending throughout the length thereof to guide the tail feather and a plurality of devices arranged in series to position and substantially maintain the fish in a substantially vertical direction, a tilting trough arranged in alinement and in close proximity to said positioning trough whereby a fish pushed from said positioning trough will pass to said tilting trough, means to tiltably mount said tilting trough adjacent the rear end thereof, said tilting trough having a channel extending throughout its length and disposed in alinement with the channel of said positioning trough, means to receive and maintain the fish in substantially the position as received from the positioning trough, and a pair of oppositely disposed spring members converging in the direction of the feed to guide the tail feather and dorsal fin.

13. In a fish filleting machine having means to form an incision in the back of the fish on each side of and adjacent the backbone thereof, means to push a fish, tail leading and back downward, to said incision-making means, and a centering trough through which the fish is pushed and wherein the fish is centered so that it is fed to the incision-making means in proper position, said centering trough comprising a positioning trough having a channel extending throughout the length thereof to guide the tail feather and a plurailty of devices arranged in series to position and substantially maintain the fish in a substantially vertical direction, a tilting trough arranged in alinement and in close proximity to said positioning trough whereby a fish pushed from said positioning trough will pass to said tilting trough, means to tiltably mount said tilting trough adjacent the rear end thereof, said tilting trough having a channel extending throughout its length and disposed in alinement with the channel of said positioning trough, means to receive and maintain the fish in substantially the position as received from the positioning trough, said channel of said tilting trough having a widened portion, and a pair of oppositely disposed spring members secured in said widened portion of said channel and converging in the direction of the feed to guide the tail feather and dorsal fin.

14. In a fish filleting machine having means to form an incision in the back of the fish on each side of and adjacent the backbone thereof, means to push a fish, tail leading and back downward, to said incision-making means, and a centering trough through which the fish is pushed and wherein the fish is centered so that it is fed to the incision-making means in proper position, said centering trough comprising a positioning trough having a channel extending throughout the length thereof to guide the tail feather and a plurality of devices arranged in series to position and substantially maintain the fish in a substantially vertical direction, a tilting trough arranged in alinement and in close proximity to said positioning trough whereby a fish pushed from said positioning trough will pass to said tilting trough, means to tiltably mount said tilting trough adjacent the rear end thereof, said tilting trough having a channel extending throughout its length and disposed in alinement with the channel of said positioning trough, said tilting trough having a plurality of pairs of spring-controlled swivel guides arranged in series to engage the fish on opposite sides thereof, and a pair of oppositely disposed spring members positioned in advance of each pair of swivel guides and converging in the direction of the feed to guide the tail feather and dorsal fin.

15. In a fish filleting machine having means to form an incision in the back of the fish on each side of and adjacent the backbone thereof, means to push a fish, tail leading and back downward, to said incision-making means, and a centering trough through which the fish is pushed and wherein the fish is centered so that it is fed to the incision-making means in proper position, said centering trough comprising a positioning trough having a channel extending throughout the length thereof to guide the tail feather and a plurality of devices arranged in series to position and substantially maintain the fish in a substantially vertical direction, a tilting trough arranged in alinement and in close proximity to said positioning trough whereby a fish pushed from said positioning trough will pass to said tilting trough, means to tiltably mount said tilting trough adjacent the rear end thereof, said tilting trough having a channel extending throughout its length and disposed in alinement with the channel of said positioning trough, said tilting trough having a plurality of pairs of spring-controlled swivel guides arranged in series to engage the fish on opposite sides thereof, a pair of oppositely disposed positioning guides positioned adjacent the feed-in end of the first of said pairs of swivel guides, and a pair of oppositely disposed spring members positioned in advance of each pair of swivel guides and converging in the direction of the feed to guide the tail feather and dorsal fin.

16. In a fish filleting machine having means to form an incision in the back of the fish on each side of and adjacent the backbone thereof, means to push a fish, tail leading and back downward, to said incision-making means, and a centering trough through which the fish is pushed and wherein the fish is centered so that it is fed to the incision-making means in proper position, said centering trough comprising a positioning trough having a channel extending throughout the length thereof to guide the tail feather and a plurality of devices arranged in series to position the fish, each of said devices comprising means to position the fish in a substantially vertical direction and means to engage the fish on opposite sides thereof, a tilting trough arranged in alinement and in close proximity to said positioning trough whereby a fish pushed from said positioning trough will pass to said tilting trough, means to tiltably mount said tilting trough adjacent the rear end thereof, said tilting trough having a channel extending throughout its length and disposed in alinement with the channel of said positioning trough, means to receive and maintain the fish in the position receive from the positioning trough, and means to guide the tail feather and dorsal fin as the fish is pushed across the tilting trough, said tilting trough being so balanced that when the tail of the fish reaches the end thereof the trough will be depressed and the tail feather will be presented in proper position to the incision-making means.

WILLIAM H. HUNT.